(12) United States Patent
Rosenberg et al.

(10) Patent No.: US 7,435,014 B2
(45) Date of Patent: Oct. 14, 2008

(54) METHODS FOR ASSEMBLING AN OPTICAL TRANSCEIVER

(75) Inventors: Paul K. Rosenberg, Sunnyvale, CA (US); Gary Sasser, San Jose, CA (US); Chris Togami, San Jose, CA (US); Donald A. Ice, Milpitas, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/924,135

(22) Filed: Aug. 23, 2004

(65) Prior Publication Data

US 2005/0018177 A1 Jan. 27, 2005

Related U.S. Application Data

(62) Division of application No. 10/609,930, filed on Jun. 30, 2003.

(51) Int. Cl.
 *G02B 6/36* (2006.01)
(52) U.S. Cl. .......................................... 385/92
(58) Field of Classification Search .................. 385/14, 385/53, 76–78, 88, 89, 92
See application file for complete search history.

(56) References Cited

U.S. PATENT DOCUMENTS

| | | | |
|---|---|---|---|
| 3,987,676 A | 10/1976 | Bennewitz | |
| 4,128,697 A | 12/1978 | Simpson | |
| 4,375,578 A | 3/1983 | Mitchell et al. | |
| 4,769,684 A | 9/1988 | Crocker et al. | |
| 5,212,345 A | 5/1993 | Guiterrez | |
| 5,545,846 A | 8/1996 | Williams et al. | |
| 6,461,058 B1 * | 10/2002 | Birch et al. | 385/92 |
| 6,480,651 B1 * | 11/2002 | Rabinski | 385/52 |
| 6,913,400 B2 | 7/2005 | O'Toole et al. | |
| 2002/0110328 A1 * | 8/2002 | Bischel | 385/49 |
| 2002/0110335 A1 * | 8/2002 | Wagner et al. | 385/89 |
| 2002/0141708 A1 * | 10/2002 | Shin et al. | 385/92 |
| 2003/0038297 A1 * | 2/2003 | Carroll et al. | 257/99 |
| 2003/0091301 A1 * | 5/2003 | Lee et al. | 385/89 |
| 2003/0103740 A1 * | 6/2003 | Edwards et al. | 385/94 |
| 2003/0133668 A1 * | 7/2003 | Wagner et al. | 385/65 |
| 2003/0180012 A1 * | 9/2003 | Deane et al. | 385/92 |
| 2004/0028348 A1 * | 2/2004 | Cote et al. | 385/88 |
| 2005/0105915 A1 | 5/2005 | Light | |

\* cited by examiner

*Primary Examiner*—Timothy Rude
(74) *Attorney, Agent, or Firm*—Workman Nydegger (57) ABSTRACT

Methods for assembly of optical transceivers. In one example, the method is performed in connection with an optical transceiver that includes a transmitter optical subassembly and a receiver optical subassembly, as well as structure that defines a pair of ports with which the transmitter optical subassembly and receiver optical subassembly, respectively, are to be aligned. This example of the method involves positioning the transmitter optical subassembly and the receiver optical subassembly in a desired position relative to each other. The transmitter optical subassembly and the receiver optical subassembly are then fixed in the desired position. Next, the transmitter optical subassembly is aligned with one of the ports, and the receiver optical subassembly is aligned with the other port. The alignment of both the transmitter optical subassembly and the receiver optical subassembly with their respective ports is performed in a single operation.

23 Claims, 9 Drawing Sheets

METHODS FOR ASSEMBLING AN OPTICAL TRANSCEIVER

RELATED APPLICATIONS

This application is a divisional, and claims the benefit, of U.S. patent application Ser. No. 10/609,930, entitled OPTICAL TRANSCEIVER HAVING A SINGLE OPTICAL SUBASSEMBLY, filed Jun. 30, 2003, and incorporated herein in its entirety by this reference.

BACKGROUND

1. The Field of the Invention

The present invention is generally related to optical transceivers used in fiber optic communications systems. In particular, exemplary embodiments of the invention relate to methods for assembling an optical transceiver.

2. Related Technology

Fiber optic technology is increasingly employed as a method by which information can be reliably transmitted via a communications network. Networks employing fiber optic technology are known as optical communications networks, and are marked by high bandwidth and reliable, high-speed data transmission.

Optical communications networks employ optical transceivers in transmitting information via the network from a transmission node to a reception node. An optical transceiver at the transmission node receives an electrical signal from a network device, such as a computer, and converts the electrical signal via a laser to an optical signal. The optical signal can then be emitted by the transceiver and transmitted in a fiber optic cable via the optical network, such as a LAN backbone, for instance. The optical signal is then received by a reception node of the network. Once received by the reception node, the optical signal is fed to another optical transceiver for conversion via a photodetector into electrical signals. The electrical signals are then forwarded to a host device, such as a computer, for processing. The optical transceivers described above have both signal transmission and reception capabilities; thus, the transmitter portion of the transceiver converts an incoming electrical signal into an optical signal, whereas the receiver portion of the transceiver converts an incoming optical signal into an electrical signal.

In addition to the laser and photodetector mentioned above, several other components are also internally included within a typical transceiver module. Among these are a controller, which governs general operation of the transceiver, a laser driver for controlling operation of the laser in the transmitter portion, and a post-amplifier for controlling the photodetector that converts incoming optical signals into electrical signals in the receiver portion.

The above components are typically disposed as chips and/or integrated circuits on multiple substrates or PCB boards within the transceiver. For example, in a typical transceiver, the controller, laser driver, and post-amplifier are located on a main PCB, while the laser and photodetector reside on separate substrates disposed in a transmitter optical subassembly ("TOSA") and receiver optical subassembly ("ROSA"), respectively.

Though the typical transceiver design discussed above has been successfully implemented in a large number of manufactured transceivers, it nonetheless introduces a number of challenges. First, the use of multiple substrates for the placement of transceiver components complicates both the internal design and manufacture of the device. In some applications, where simple transceiver design is desired, this complexity is disadvantageous.

Second, the placement of the laser and photodetector on separate substrates not only involves extra componentry and additional assembly steps, but it also complicates the process of aligning the laser and photodetector. During transceiver assembly, the laser must be properly aligned to effectively transmit the optical signals it produces during transceiver operation through a fiber optic cable that connects to the transceiver. Similarly, the photodetector must be properly aligned within the transceiver to effectively receive optical signals received from another fiber optic cable attached to the transceiver. If the laser or photodetector is misaligned, effective optical communication by the transceiver can be severely hampered. In typical transceivers, alignment of the laser and photodetector must take place separately, wherein one component, then the other, is aligned. This need for separate alignment undesirably equates to prolonged transceiver assembly and calibration times.

In light of the above discussion, a need currently exists for a transceiver that benefits from simple design and streamlined assembly. In particular, a transceiver is needed that consolidates optical component alignment in order to simplify transceiver alignment and calibration. Moreover, such a transceiver should include a minimum of parts and should enable the assembly thereof without the use of numerous fastening devices.

BRIEF SUMMARY OF AN EXEMPLARY EMBODIMENT OF THE INVENTION

Briefly summarized, embodiments of the present invention are directed to methods for assembling an optical transceiver. In one exemplary implementation, the method is employed in connection with one or more optical transceivers, each of which includes a transmitter optical subassembly and a receiver optical subassembly, as well as structure that defines a pair of ports with which the transmitter optical subassembly and receiver optical subassembly, respectively, are to be aligned.

Initially, the exemplary method involves positioning the transmitter optical subassembly and the receiver optical subassembly in a desired position relative to each other. The transmitter optical subassembly and the receiver optical subassembly are then fixed in the desired position. Next, the transmitter optical subassembly is aligned with one of the ports, and the receiver optical subassembly is aligned with the other port. The alignment of both the transmitter optical subassembly and the receiver optical subassembly with their respective ports is performed in a single operation. By thus consolidating alignment of the transmitter optical subassembly and the receiver optical subassembly into a single operation, the complexity of the assembly procedure is reduced, and the assembly and calibration procedures hastened.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXEMPLARY EMBODIMENTS OF THE INVENTION

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale.

FIGS. 1-8 depict various features of embodiments of the present invention, which is generally directed to an optical transceiver for use in optical communications, the transceiver having simplified design and assembly characteristics. In particular, active optical components, such as the laser and the photodetector, are disposed together on a single printed circuit board within the transceiver body so as to enable a single alignment operation for the active components. The present transceiver also enables assembly thereof with a minimum of fasteners, speeding manufacture and reducing assembly costs. Finally, because of its design, the transceiver disclosed herein reduces both optical and electrical crosstalk within the transceiver.

Figure 1:
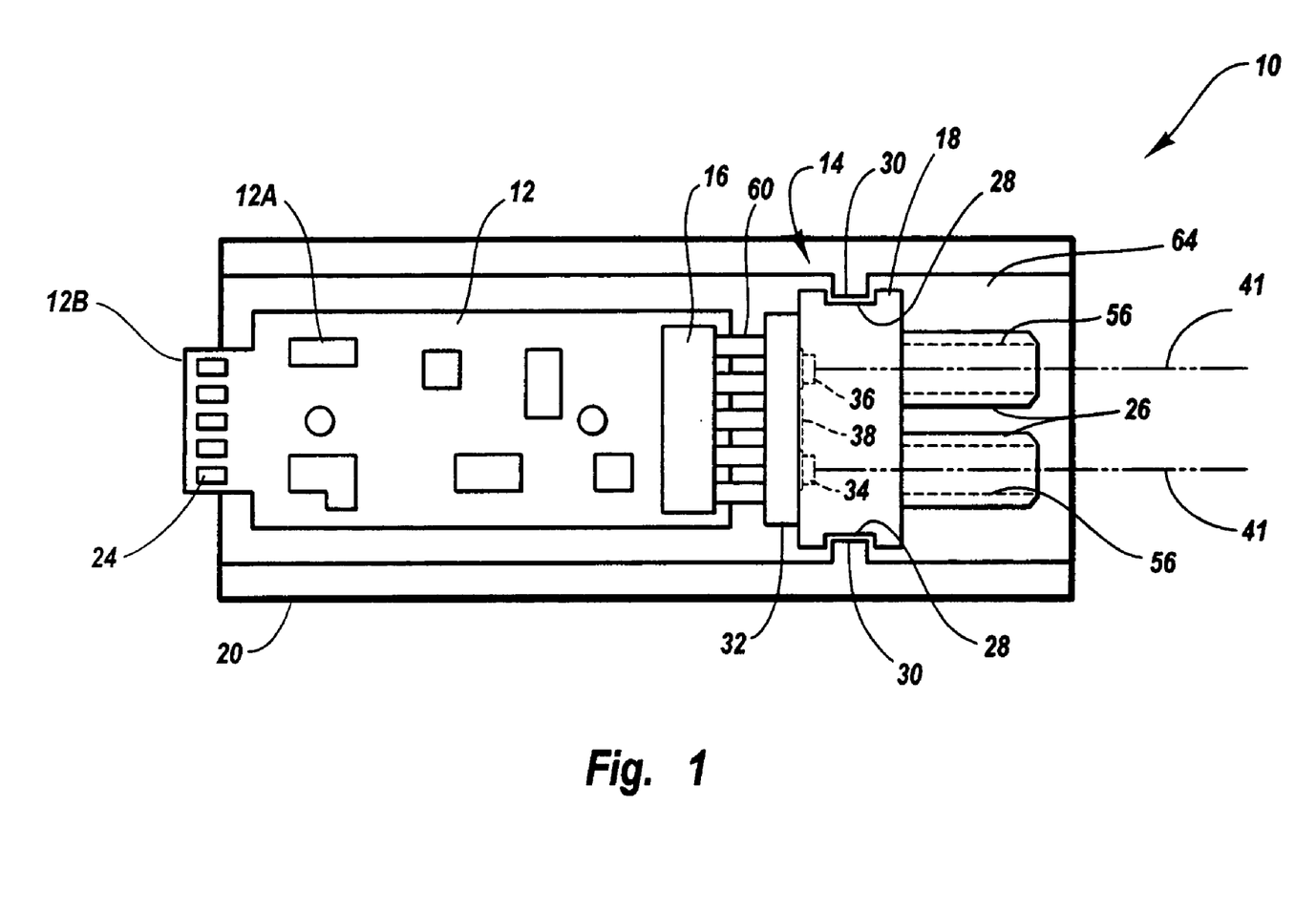
FIG. 1 is a bottom view of an optical transceiver module according to one embodiment of the present invention.

Reference is first made to FIG. 1, which depicts various components comprising an optical transceiver, generally designated at 10, according to one presently preferred embodiment. FIG. 1 shows a bottom view of the transceiver 10, which generally includes a transceiver printed circuit board ("TPCB") 12 and a transmitter/receiver optical E subassembly ("TROSA") 14. The TPCB 12 and TROSA 14 are interconnected within the transceiver via a TROSA connector 16. The TROSA 14, as will be explained, is generally comprised of a TROSA substrate 32 and a sleeve assembly 18. The aforementioned components are housed within a shell 20 and a closure 22 (see FIG. 7E) that together form a portion of the transceiver housing. Further details concerning each of these components, including their operable relationship once assembled into the transceiver 10, are discussed below.

The TPCB 12 is positioned within the shell 20 of the transceiver 10 so as to house components that are necessary for transceiver operation. Comprising a suitable material typical of printed circuit boards, the TPCB 12 can include thereon various passive and other electrical and optical components 12A that provide functionality for the transceiver 10. The TPCB 12 further serves as a conduit through which electrical signals and data can be exchanged between components, such as the TROSA 14, and a host device (not shown) or other component. For instance, an electrical signal from the host device containing data to be transmitted by the transceiver 10 can be relayed from the host device to the transmitting components of the transceiver via the TPCB 12. To that end, the TPCB 12 can include on an end thereof a connector 12B for interfacing with the host device. The connector 12B can include electrical contacts 24 or similar means that electrically connect with similar contacts of the host device for transmitting signals back and forth between the transceiver 10 and the host device. Of course, it is recognized that the specific details as to the connector and electrical contacts can be varied from what is described herein.

The TROSA 14 is positioned within the shell 20 of the transceiver 10 adjacent the TPCB 12. As will be seen below, the TROSA 14 includes both passive and active optical and electrical components that are involved in both the transmission and reception of optical signals by the transceiver. The TROSA 14 is electrically connected to the TPCB 12 via the TROSA connector 16 in a configuration to be detailed further below. Connection with the TPCB 12 via the TROSA connector 16 enables the TROSA 14 to relay data both to and from the host device during operation of the transceiver 10. Also, as will be explained, the substrate 32 of the TROSA 14 comprises a singular structure within the transceiver 10, which substantially simplifies both the design and assembly of the transceiver.

FIG. 1 depicts further details of the TROSA 14, wherein the sleeve assembly 18 is shown operably connected to the TROSA substrate 32 within the shell 20. The sleeve assembly 18, comprising molded plastic or other suitable material, is connected to the substrate 32 and carefully positioned with respect thereto to enable alignment between active optical components of the substrate and connectorized fiber optic cables (not shown) that attach to each of hollow sleeves 26 of the sleeve assembly. The fiber optic cables carry the optical signals that are transmitted and received by the transceiver 10, as is well known. Further details concerning the precise alignment attained between the substrate 32 and the sleeve assembly 18 are given further below.

Though the embodiment illustrated in FIG. 1 shows the sleeve assembly 18 as a unitary component, it is appreciated that in other embodiments the sleeve assembly can comprise two or more discrete components. For example, the sleeve assembly 18 could comprise two pieces, each piece including one of the sleeves 26. In such an embodiment, alignment between only one active component, such as a laser or photodetector (discussed below), and one of the sleeve assembly pieces is necessary, thereby obviating the need for precise positioning of the active components with respect to one another. The sleeve assembly 18 in such an embodiment is also affected to a lesser degree by effects related to the thermal coefficient of expansion of the sleeve assembly material when compared to other sleeve assembly configurations.

In the illustrated embodiment, the body of the sleeve assembly 18 includes slots 28 on either side that are sized to engage in a sliding arrangement with corresponding tracks 30 defined on either interior side of the shell 20. The engagement of the slots 28 with the tracks 30 enables the sleeve assembly 18 to be securely positioned within the shell 20 in a specified orientation so as to enable connectorized fiber optic cables (not shown) to pass through the open end of the shell and engage the sleeves 26. In addition, this slot/track engagement also assists in preventing undue stress on the physical and electrical connection between the TROSA substrate 32 and the TROSA connector 16 (described below) when the connectorized fiber optic cables are mated, using a compressive force, with the sleeves 26. During connection of the cables to the sleeves 26, the engagement of the slots 28 with the tracks 30 prevents significant movement of the sleeve assembly 18 with respect to the shell 20, thereby preventing compression damage to the TROSA substrate 32, the TROSA connector 16, or the electrical contacts located therebetween. In addition, by preventing significant movement of the TROSA 14, the slot/track engagement helps ensure that optical alignment between the active optical devices and the sleeve assembly 18 is not altered when the connectorized fiber optic cables are attached to the sleeves 26.

As can be seen, the shell 20 is responsible for at least partially housing the various components referred to above. Comprising a suitable material such as metal or plastic, the shell 20 can comprise a shape similar to that shown in FIG. 1, or a distinct shape according to a particular design or anticipated application for the transceiver 10. Together with the closure 22 (discussed further below), the shell 20 at least partially forms the external housing for the transceiver 10.

Figure 2A:
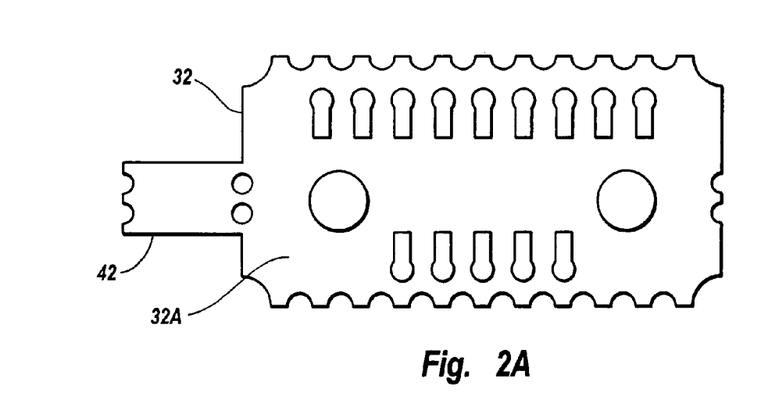
FIG. 2A is a top view of a substrate comprising part of the transmitter/receiver optical subassembly ("TROSA"), which in turn forms a portion of the optical transceiver module shown in FIG. 1.
Figure 2B:
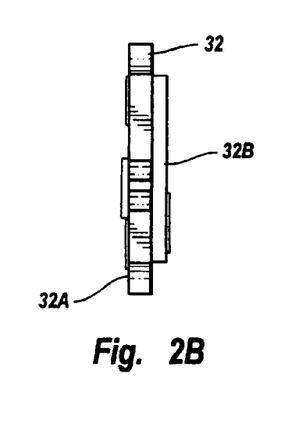
FIG. 2B is a side view of the TROSA substrate shown in FIG. 2A.
Figure 2C:
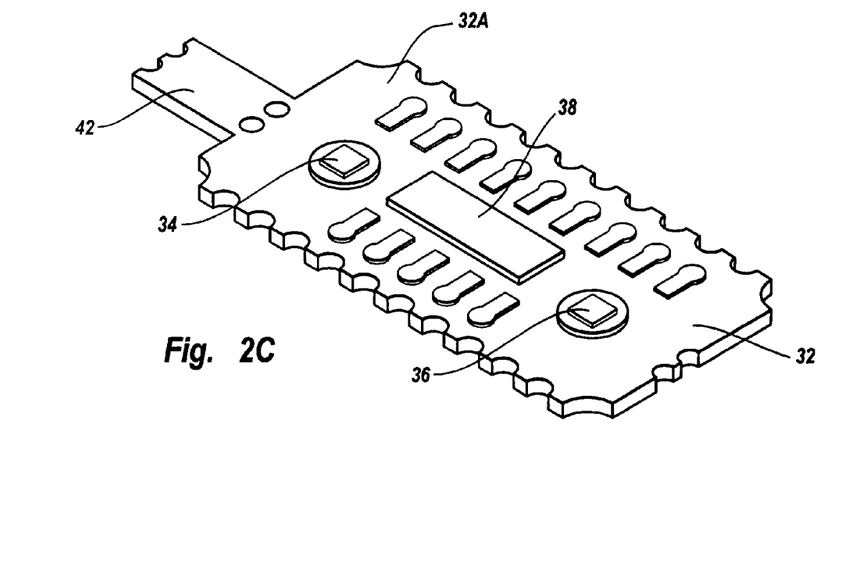
FIG. 2C is a perspective view of the TROSA substrate of FIG. 2B.

Reference is now made to FIGS. 2A-2C, which depict various views of the substrate 32, comprising part of the TROSA 14. As seen, the TROSA substrate 32 is made of a suitable material, such as FR4 or alumina. The substrate 32 serves as a platform upon which active and passive optical components of the TROSA 14 are positioned. The shape of the substrate 32 can vary according to need, but it should be shaped as to cooperatively engage with the sleeve assembly 18 during assembly, as will be seen. In the present embodiment, the substrate 32 is in the form of a flat, rectangular-shaped wafer.

Positioned upon a first side 32A of the substrate 32 is a plurality of electrical and optical components that are involved in both the transmission and reception of optical signals, as well as the conversion and modulation of those signals during transceiver operation. Particularly, the substrate 32 includes various components that are responsible for converting electrical data signals provided by the host device into optical data signals suitable for transmission via fiber optic cables to an optical communications network, as well as components designed to convert optical data signals received from the network into electrical data signals for use by the host device. Though both the particular type and number of these components can vary, in presently preferred embodiments both active and passive optical components are positioned on the first side 32A of the unitary substrate 32, including a laser 34, a photodetector 36, and an integrated circuit ("IC") 38.

The laser 34, an active optical chip component, is responsible for producing an optical signal from an electrical data signal received from the host device or other component. Once it is modulated with the data carried by the electrical signal, the optical signal emitted from the laser is directed through one sleeve 26 of the sleeve assembly 18 and into a fiber optic cable for transmission to the optical communications network.

The photodetector 36 is also an active optical chip component and is responsible for receiving a modulated optical signal from a source external to the transceiver 10 and converting it back to an electrical data signal for use by the host device or similar component. The IC chip 38 contains circuitry for controlling and assisting the laser 34 and the photodetector 36 in their functions as described herein. In addition to these components, additional passive optical and electrical components, such as resistors and capacitors, can also be located on the substrate 32. It is appreciated that the laser 34, the photodetector 36, and associated components to be located on the substrate 32 can be packaged in multiple hermetic subassemblies that afford environmental protection to the components.

In contrast to known transceiver designs, where a transmitter optical subassembly and a receiver optical subassembly are positioned on separate substrates, the active optical components of the TROSA 14, namely, the laser 34, the photodetector 36, and the IC 38, are disposed on a single substrate, i.e., the substrate 32. Thus, the primary active components necessary for transmitting and receiving optical signals within the transceiver 10 are disposed on the unitary substrate 32. These and other components are secured to the first side 32A of the substrate 32 using known methods, and are further interconnected to a plurality of conductive traces 40 (see FIG. 6D) located on a second side 32B of the substrate. This interconnection can be provided by wire bonds, plated through-hole vias, conductive solders, conductive adhesives, flip chipping, or other suitable means. The conductive traces 40 enable the components located on the substrate 32 of the TROSA 14 to electrically connect with the TPCB 12 via the TROSA connector 16, as will be seen.

Because the active optical transmitting and receiving components of the transceiver 10 are positioned on a single substrate 32, calibration and assembly procedures that take place during transceiver manufacture are simplified. Specifically, alignment operations, which take place during manufacture and which are required to ensure that the laser 34 and photodetector 36 are properly aligned with the connectorized fiber optic cables that attach to the transceiver, are simplified in that only one platform (i.e., the TROSA substrate 32) need be maneuvered in order to align both the laser and the photodetector. Thus, alignment operations are substantially simplified, which in turn speeds assembly during manufacture, and hastens in-field maintenance after the transceiver is placed into operation.

In order to facilitate their simplified alignment during assembly, the laser 34 and the photodetector 36 must be precisely positioned with respect to one another and secured to the substrate 32 with that precise positioning intact. As seen in FIG. 2C, in one embodiment the laser 34 and photodetector 36 are positioned near opposing ends of the substrate 32. The IC 38 is positioned between the laser 34 and the photodetector 36. The spacing and position of the laser 34 and the photodetector 36 as seen in FIG. 2C is such that each component will be linearly aligned with optical conduits 56 formed by the sleeves 26 of the sleeve assembly 18. The optical conduits 56 serve as ports through which optical signals pass during transceiver operation when the sleeve assembly 18 is mated with the substrate 32. The linear alignment between the laser 34, the photodetector 36 and the respective conduits 56 of the sleeves 26 is indicated in FIG. 1 by alignment lines 41. In one embodiment, variation in the spacing between the laser 34 and the photodetector 36 on the substrate 32 should not vary by more than +/−5 microns in order to ensure this linear alignment with the sleeve assembly sleeves 26. Further details concerning this alignment are given below. The positional placement of the above components is exemplary; multiple configurations for these and other components of the TROSA 14 can alternatively be used, as appreciated by one of skill in the art. Further, other components, in addition to the laser 34 and the photodetector 36, can also be precisely positioned on the substrate 32 to achieve similar objectives, if desired.

Figure 3:
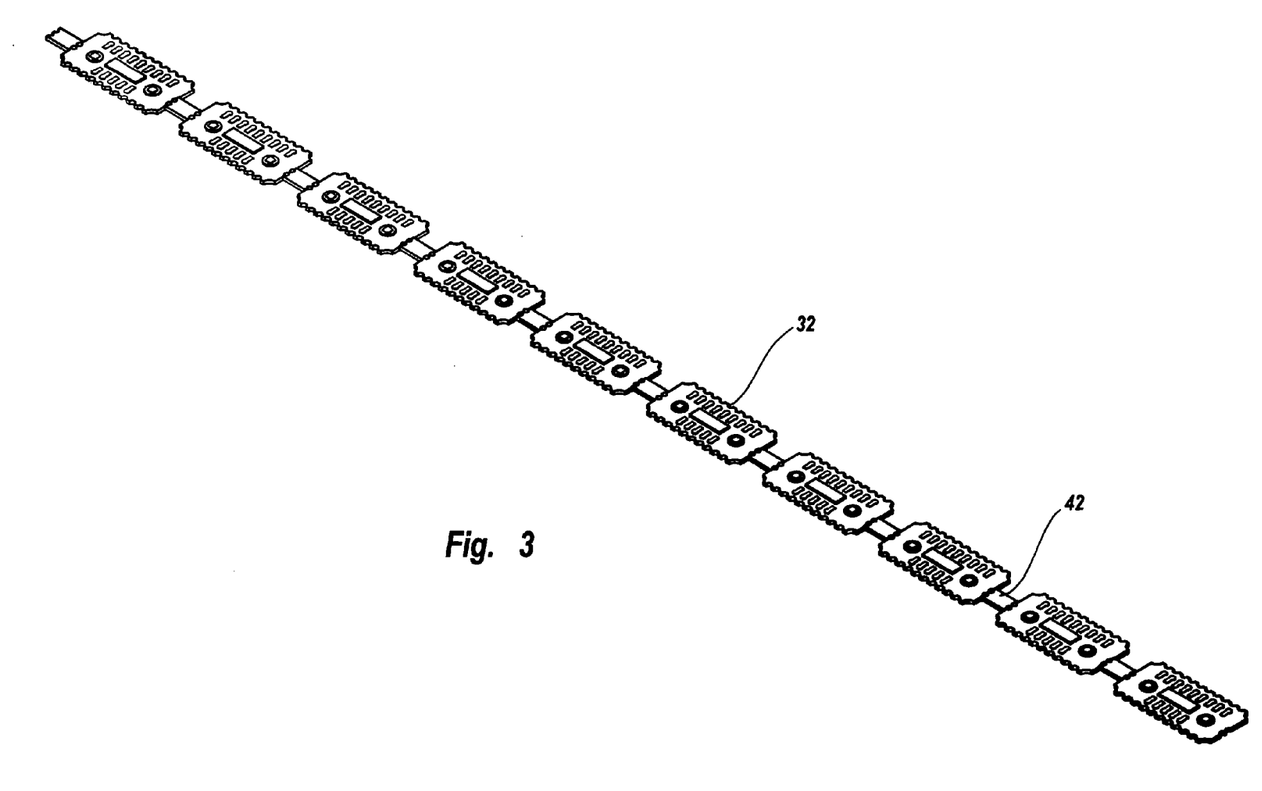
FIG. 3 is a perspective view of one configuration for arranging multiple TROSA substrates in a strip according to one embodiment of the present invention.

Reference is now made to FIG. 3, which shows a plurality of substrates 32 that have been manufactured as described above and that are now ready to be assembled with other transceiver components. In this embodiment, assembly of the transceiver 10 can be made more efficient by manufacturing the substrates 32 in a strip-like configuration with other identical substrates. Each substrate 32 is removably joined to adjacent substrates via perforated connector portions 42. The strip of substrates 32 shown in FIG. 3 can be used with other apparatus to be described herein in facilitating, for instance, rapid mating of the substrates 32 with sleeve assemblies 18, as will be seen. It should be remembered, however, that the strip configuration depicted in FIG. 3 shows only one possible assembly arrangement for the substrates 32. Indeed, the substrates 32 can be configured in other assembly configurations that differ from that depicted here without affecting other structural or functional properties of the TROSA as described herein.

Figure 4A:
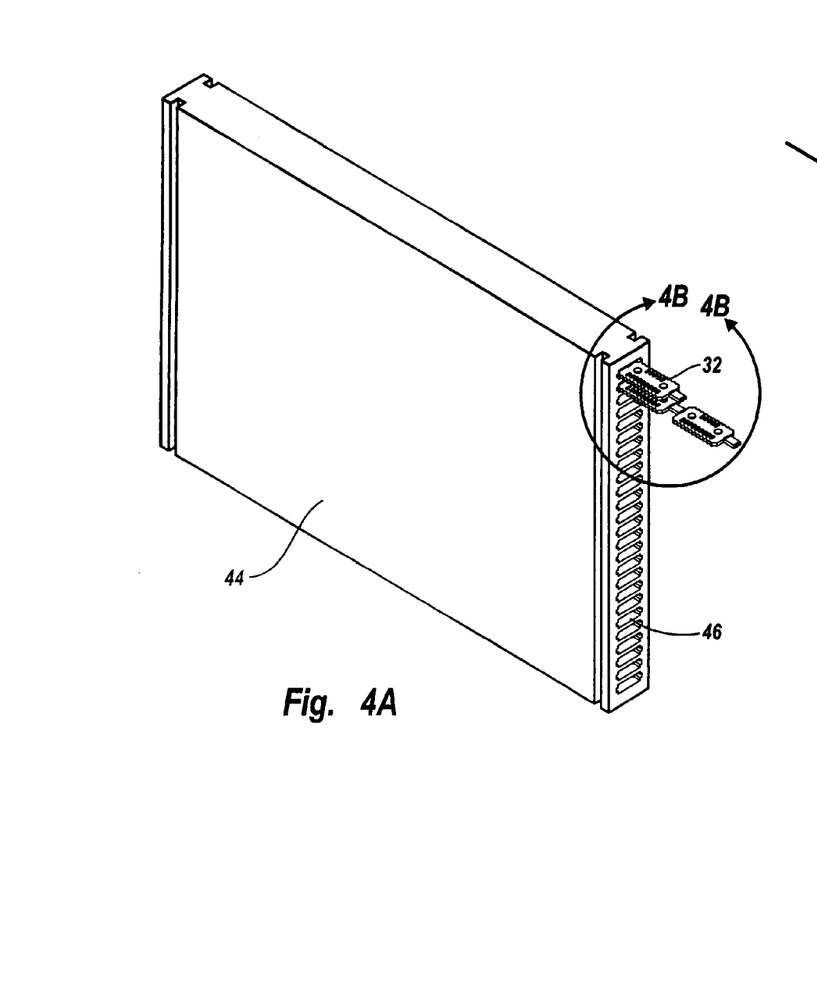
FIG. 4A is a perspective view of a TROSA substrate strip magazine made in accordance with embodiments of the present invention.
Figure 4B:
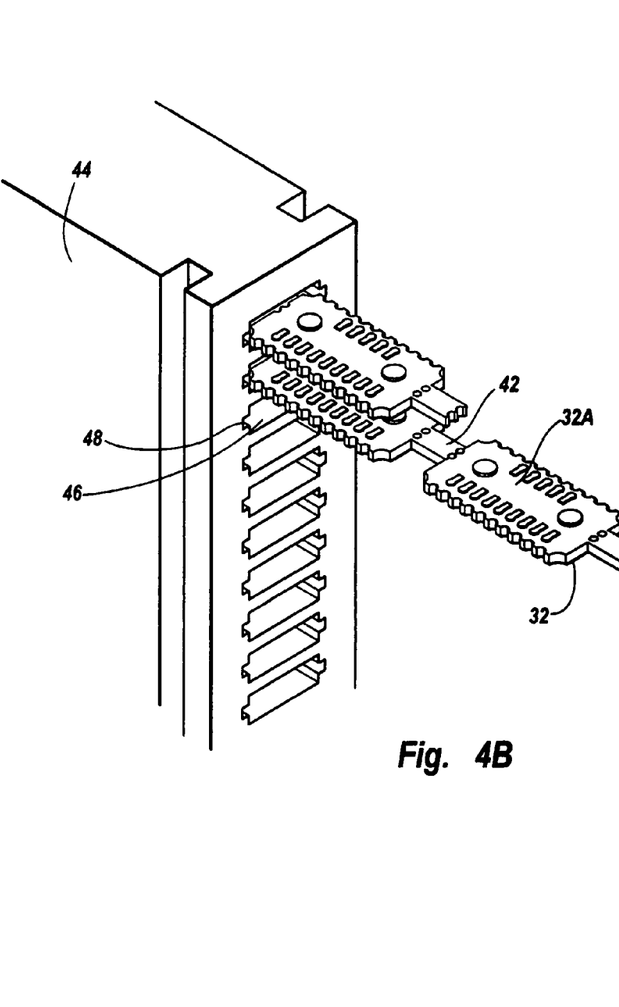
FIG. 4B is a close-up view of a portion of the TROSA substrate strip magazine of FIG. 4A.

Reference is now made to FIGS. 4A and 4B, which depict a TROSA substrate strip magazine 44 for use in connection with assembly of the present transceiver 10. The magazine 44, which is made from a suitable material, such as extruded aluminum, is shaped to define a plurality of slots 46 that are each in turn sized to receive therein a strip of substrates 32, such as that shown in FIG. 3. FIG. 4B shows the manner in which a strip of substrates 32 is received into one of the slots 46 of the magazine 44. Each slot 46 is shaped with notches 48 that engage the edges of the substrate strip as to enable the substrate strip to slide within the slot while protecting the electrical and optical components disposed on the surfaces of each substrate 32. The magazine 44 can be configured to receive any number of substrate strips, as well as strips of different lengths, if needed. Further details will be given further below as to the contribution of the magazine 44 to the assembly of the present transceiver 10.

Figure 5A:
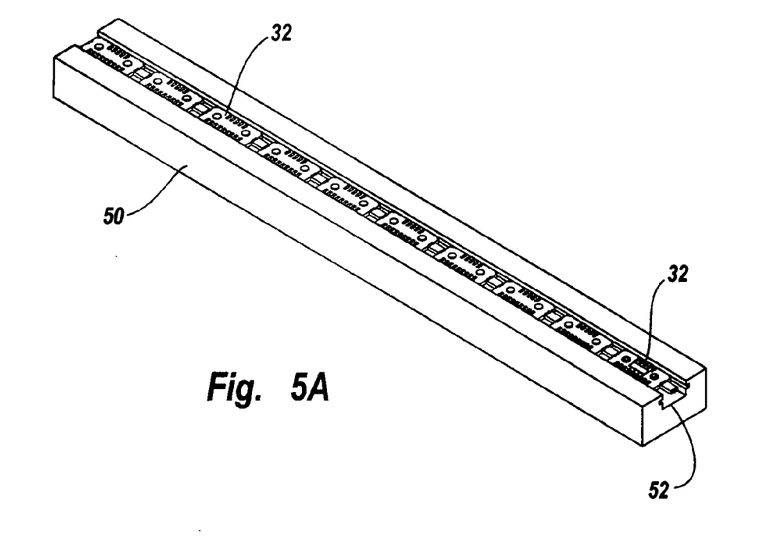
FIG. 5A is a perspective view of a TROSA substrate feed rail used in accordance with embodiments of the present invention.
Figure 5B:
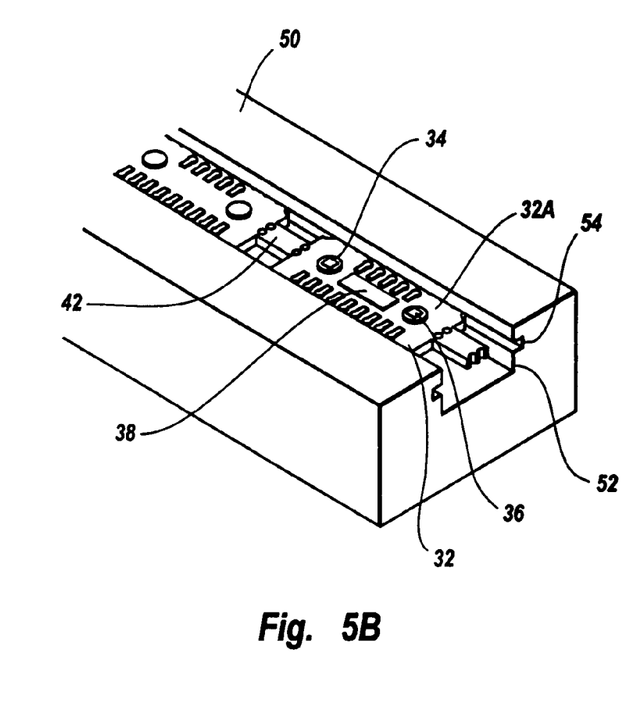
FIG. 5B is a close-up view of a portion of the TROSA substrate feed rail of FIG. 5A.

FIGS. 5A and 5B show another component that is used in the assembly of the transceiver 10, according to one embodiment thereof. A TROSA substrate feed rail 50 is shown, being sized to receive within a track 52 defined therein a strip of substrates 32. The track 52 is shaped similar to the slots 46 defined in the magazine 44 (see FIGS. 4A and 4B). In particular, notches 54 are defined in the track 52 to engage the edges of the substrate strip such that the strip is enabled to slide along the track without damaging any of the electrical and optical components that are located on the surfaces of each substrate 32. The feed rail 50 is utilized in one embodiment in transporting strips of substrates 32 from location to location during transceiver assembly. For instance, the feed rail 50 depicted in FIG. 5A is shown transporting a strip of substrates 32 from one magazine to another magazine (not shown). As shown in FIG. 5B, during this transport one or more assembly/manufacturing steps can be performed, such as the attachment of the laser 34, the photodetector 36, and the IC 38 to the first side 32A of each substrate 32, if this step has not already been performed.

Figure 6A:
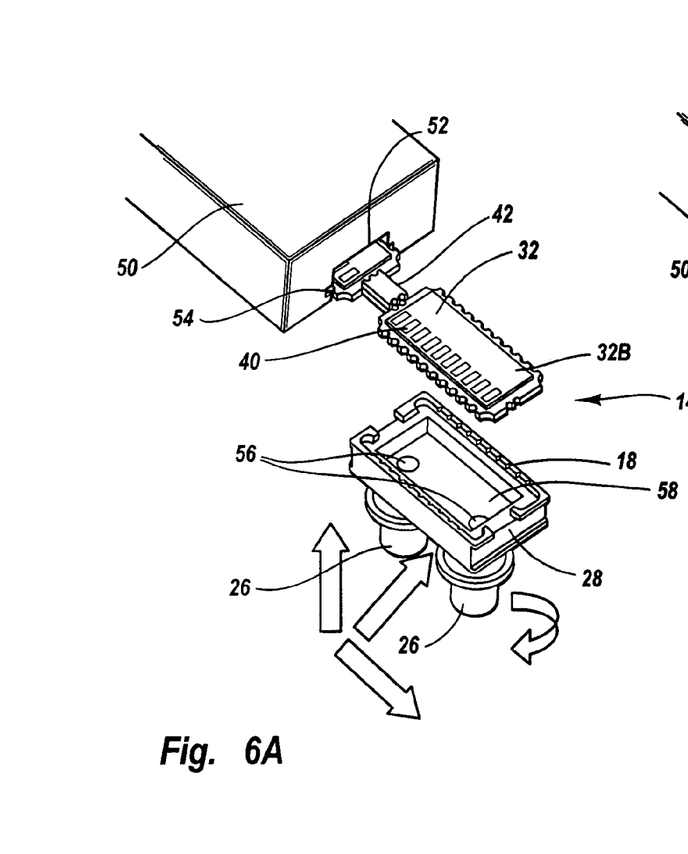
FIG. 6A is a perspective view showing one step in the manufacture of the TROSA according to embodiments of the present invention.

Reference is now made to FIGS. 6A-6D in describing various details regarding the assembly of the substrate 32 with the sleeve assembly 18. In FIG. 6A, a substrate 32, still connected to the strip of substrates via the connector portion 42, is shown extending from the feed rail 50, which is shown here in an inverted position, in contrast to FIGS. 5A and 5B. Though not shown in this figure, the active optical components, such as the laser 34, the photodetector 36, and the IC 38, have already been precisely positioned and attached to the first side 32A of the substrate 32. The conductive traces 40, which interconnect with the active optical and other components on the first side 32A of the substrate 32, are shown on the second side 32B of the substrate.

The sleeve assembly 18 is also shown in FIG. 6A immediately before being mated with the substrate 32. As indicated, the sleeve assembly 18 can be maneuvered to properly align it with the substrate 32 before mating. In particular, the sleeve assembly 18 is aligned such that the optical conduits 56 defined through the sleeves 26 (see FIG. 1) are aligned with the laser 34 and the photodetector 36 on the first side 32A of the substrate 32. This enables optical signals to either emanate from (in the case of the laser) or arrive at (in the case of the photodetector) the transceiver 10 via connectorized fiber optic cables that are attached to each sleeve 26. This alignment, which is indicated by the alignment lines 41 in FIG. 1, ensures that optical signals are properly transmitted and received at the substrate 32. If precise alignment is not achieved between either the laser 34 or photodetector 36 and the conduits 56, transmission or reception of optical signals can be hindered, thus hampering or preventing operation of the transceiver 10. The sleeve assembly 18 can be maneuvered through various axes of rotation and lines of translation in order to achieve optimum alignment, while the substrate 32 is maintained in a stationary position by the feed rail 50. Various apparatus (not shown) can be used to perform this alignment. Alternatively, in other embodiments the sleeve assembly 18 can be supported while the substrate 32 is maneuvered into a proper position, or both components can be simultaneously maneuvered.

Note that the alignment spoken of above between the conduits 56 of the sleeve assembly 18 and the laser 34 and photodetector 36 of the substrate 32 is established in a single operation. At least two features of the present invention that have already been mentioned make this possible: first, both the laser 34 and the photodetector 36 are attached to a single substrate, i.e., the substrate 32. Second, the laser 34 and the photodetector 36 are precisely positioned with respect to one another upon the substrate 32 of the TROSA 14 before attachment, so that alignment of one of these active optical components with the g respective optical conduit 56 results in the alignment of the other as well.

It should be noted that the alignment process can be performed in an active or a passive manner. In active alignment, the active components of the substrate 32 are activated and their respective input or output power is measured to ensure their alignment with the corresponding optical conduit 56. In passive alignment, precise component placement within preformed assembly structures is used to ensure proper alignment. Finally, it is noted that alignment may be performed on each substrate 32 separately, or collectively using a batch of substrates.

Figure 6B:
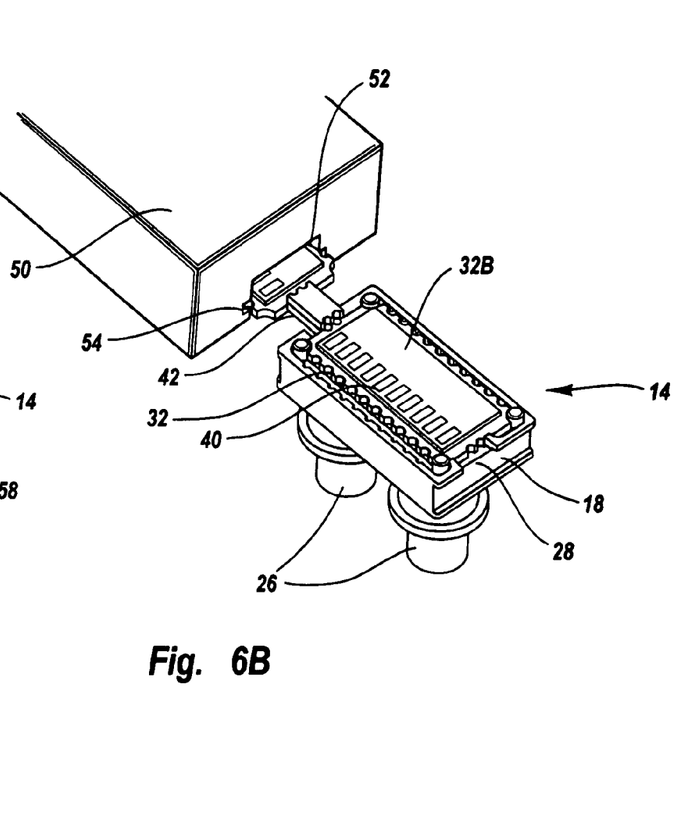
FIG. 6B is a perspective view showing another step in the manufacture of the TROSA according to embodiments of the present invention.

FIG. 6B shows the attachment of the TROSA substrate 32 with the sleeve assembly 18. Once alignment of the sleeve assembly 18 with the substrate 32 is complete, the two can be mated together by a suitable apparatus (not shown). The substrate 32 is received by the sleeve assembly 18 into a recess 58 formed in the assembly such that the first side 32A of the substrate containing the laser 34 and photodetector 36 is directed inward into the recess. Light cure resin gluing (at each corner of the substrate 32) or other suitable attachment means (such as adhesive, solder, welding, heat staking, etc.) is used to secure the substrate to the sleeve assembly 18. As mentioned, this attachment scheme precisely aligns both the laser 34 and the photodetector 36 of the substrate 32 with the conduits 56 of the sleeve assembly 18 to enable proper transmission and reception of optical signals during transceiver operation.

Figure 6C:
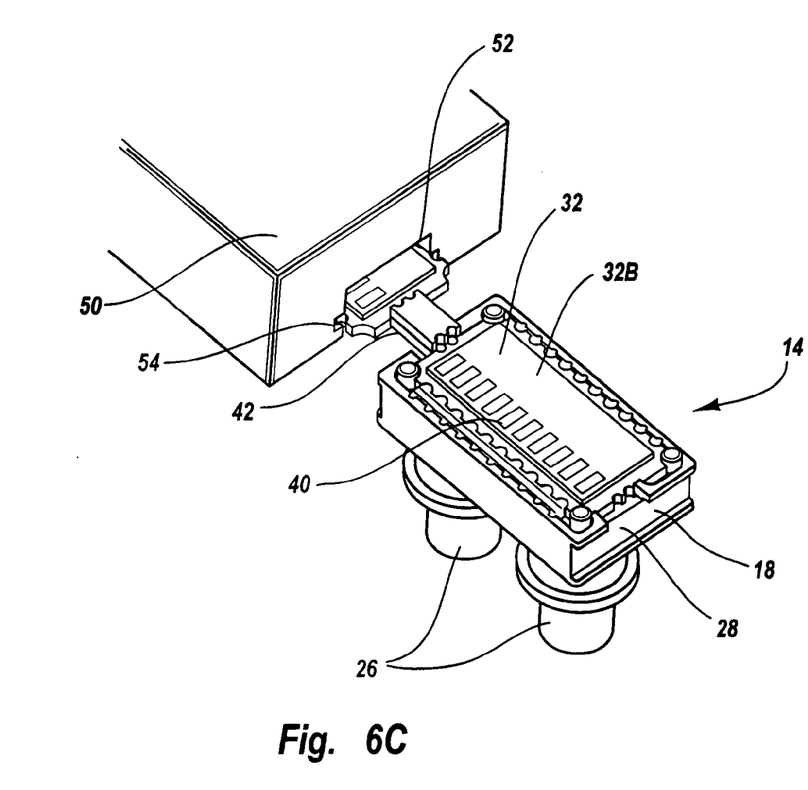
FIG. 6C is a perspective view showing yet another step in the manufacture of the TROSA according to embodiments of the present invention.
Figure 6D:
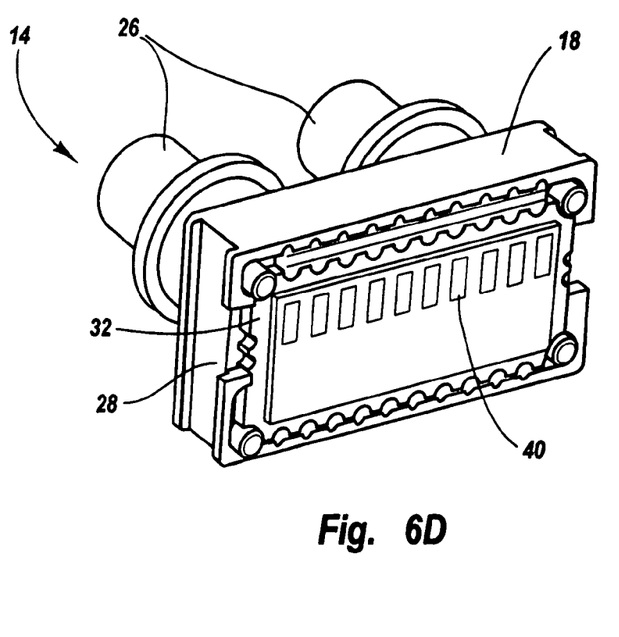
FIG. 6D is a perspective view of the TROSA following the manufacturing steps shown in FIGS. 6A-6C.

FIG. 6C shows a succeeding step in the assembly of the substrate 32 and the sleeve assembly 18. After the two components have been mated, an epoxy or similar backfill material is injected about the periphery of the substrate 32 to solidify the connection between it and the sleeve assembly 18. FIG. 6D shows a perspective view of the sleeve assembly/substrate combination after the preceding assembly steps have been completed.

Figure 7A:
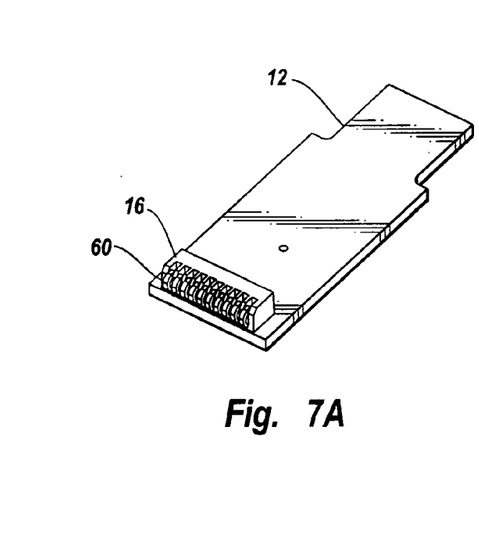
FIG. 7A is a perspective view of a printed circuit board assembly employed in one embodiment of the optical transceiver of the present invention.

Reference is now made to FIGS. 7A-7E in discussing various details regarding the assembly of the transceiver 10. In FIG. 7A, the TPCB 12 is shown without optical or electrical components disposed thereon for clarity. The TROSA connector 16 is shown attached to the TPCB 12 on a bottom side thereof. The TROSA connector 16 includes a plurality of spring fingers 60 or similar components for electrically connecting with the plurality of conductive traces 40 located on the second side 32B of the TROSA substrate 32 when the transceiver 10 is fully assembled. This connection enables the TROSA 14 to electrically connect with both the TPCB 12 and, indirectly, with the host device via the TPCB connector 12B (see FIG. 1). The TROSA connector 16 is connected to the TPCB 12 by any suitable means, such as soldering, screws, mechanical snaps, pins, or the like.

Figure 7B:
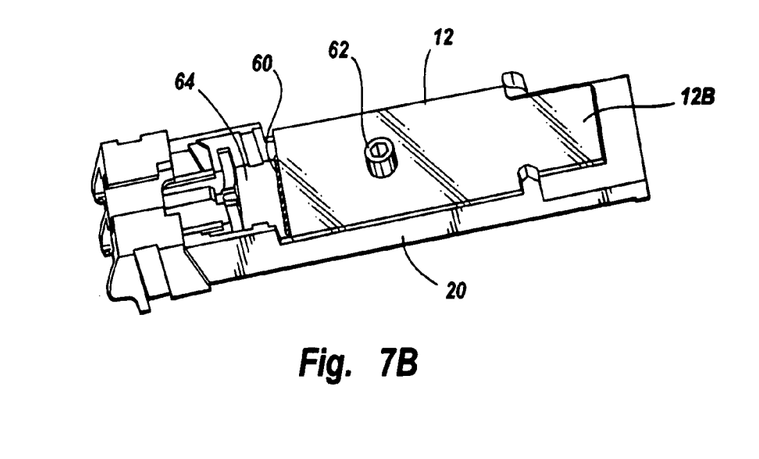
FIG. 7B is a perspective view showing one step in the assembly of an optical transceiver according to embodiments of the present invention.

In FIG. 7B, the TPCB 12 is shown attached to a portion of the shell 20 by way of an attachment screw 62. The connector 12B of the TPCB 12 is shown extending toward one end of the shell 20 such that it is able to connect with a host device (not shown). The TROSA connector 16, now located on the bottom face of the TPCB 12, is shown at the opposing end of the TPCB 12. In alternative embodiments, the TPCB 12 is disposed within the shell 20 via a friction fit, snap fit, or other attachment scheme that obviates any need for mechanical fasteners.

Figure 7C:
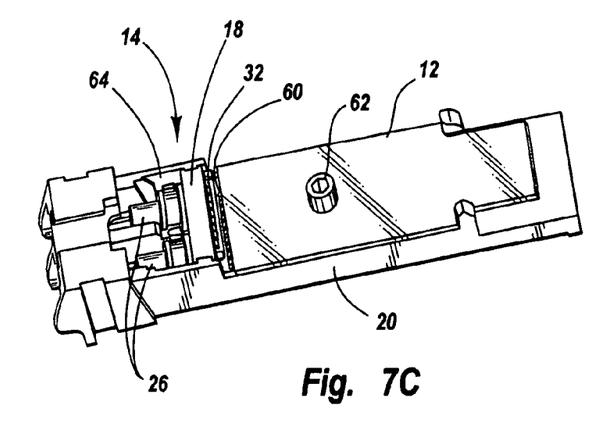
FIG. 7C is a perspective view showing another step in the assembly of an optical transceiver including placement of the TROSA according to embodiments of the present invention.
Figure 7D:
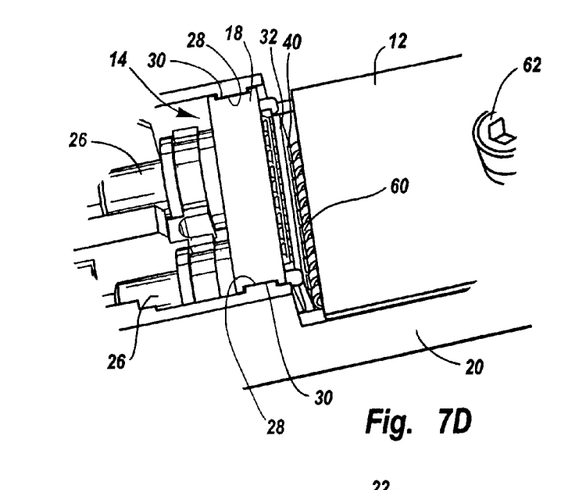
FIG. 7D is a close-up view of various optical transceiver components shown in FIG. 7C.

FIG. 7C shows the TROSA 14, comprising the substrate 32 and sleeve assembly 18, positioned in the shell 20. As seen, the shell 20 is cooperatively shaped to receive these and the other components comprising the transceiver 10. As such, the sleeves 26 of the sleeve assembly 18 are received into a recess 64 defined in the shell 20. The recess 64 is shaped as to accommodate connectorized fiber optic cables that attach to each of the sleeves 26 when the transceiver 10 is fully assembled. The sleeve assembly 18 is further aligned and secured within the shell 20 by the engagement between the sleeve assembly slots 28 and the shell tracks 30.

In its seated position within the shell 20, the TROSA 14 is positioned such that the conductive traces 40 of the substrate 32 physically engage with the spring fingers 60 of the TROSA connector 16, which is connected to the TPCB 12, thereby establishing an electrical connection between the TPCB and the TROSA via the TROSA connector. This connection is more clearly shown in FIG. 7D. The present configuration is such that the TROSA 14 need not be hermetically packaged to function within the transceiver 10. In addition, the connection between the TROSA 14 and the TROSA connector 16 is a friction fit. These features simplify the manufacture of the transceiver 10, thereby reducing costs associated therewith.

Figure 7E:
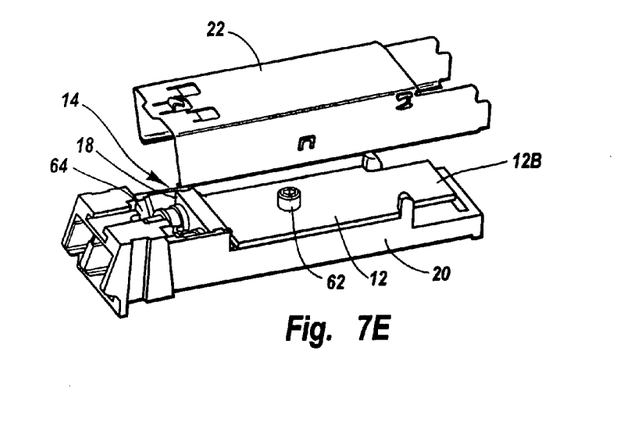
FIG. 7E is a perspective view showing yet another step in the assembly of an g optical transceiver according to embodiments of the present invention.

In FIG. 7E the closure 22, comprising metal, plastic, or other suitable material, is shown being placed on the shell 20 so as to mate therewith, forming at least a portion of a housing for the transceiver 10 after the aforementioned components have been assembled. Preferably, the closure 22 connects with the shell 20 in a snap-fit configuration, further simplifying assembly. Once the closure 22 is in place, it assists in maintaining the TPCB 12 and the TROSA 14 in place.

Figure 8:
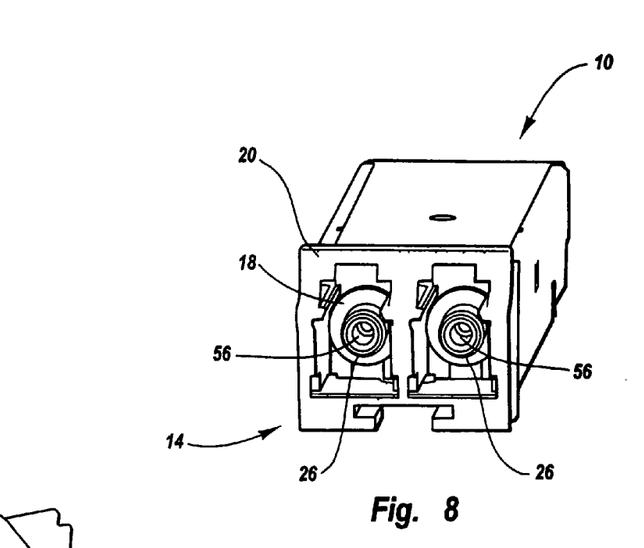
FIG. 8 is a perspective end view of an optical transceiver according to one embodiment of the present invention after assembly thereof.

FIG. 8 shows a perspective view of the transceiver 10 as fully assembled. As seen and described herein, the transceiver 10 comprises a simple design and assembly, including the singular TROSA 14, which replaces the multiple optical subassemblies of prior designs.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A method of assembling a portion of at least one optical transceiver that includes a transmitter optical subassembly and a receiver optical subassembly, and the at least one optical transceiver further including structure that defines a pair of ports, the method comprising:

positioning the transmitter optical subassembly and the receiver optical subassembly in a desired position relative to each other;

fixing the transmitter optical subassembly and the receiver optical subassembly in the desired position to a single substrate;

aligning the pair of ports with respect to each other;

fixing the pair of ports with respect to each other;

aligning the transmitter optical subassembly with one of the ports; and aligning the receiver optical subassembly with the other port, the alignment of the receiver optical subassembly and the transmitter optical subassembly with the ports being performed in a single operation, wherein fixing the pair of ports with respect to each other is performed before aligning the transmitter optical subassembly with one of the ports and before aligning the receiver optical subassembly with the other port.

2. The method as recited in claim 1, wherein alignment of the transmitter optical subassembly and the receiver optical subassembly with the respective ports is performed substantially simultaneously.

3. The method as recited in claim 1, wherein alignment of one of the transmitter optical subassembly or receiver optical subassembly results in the automatic alignment of the other transmitter or receiver optical subassembly.

4. The method as recited in claim 1, wherein aligning the transmitter and receiver optical subassemblies comprises linearly aligning the transmitter and receiver optical subassemblies with respective ports.

5. The method as recited in claim 1, wherein the transmitter and receiver optical subassemblies are positioned in a spaced-apart arrangement relative to each other.

6. The method as recited in claim 1, wherein the transmitter and receiver optical subassemblies are fixed in substantially the same plane.

7. The method as recited in claim 1, wherein the alignment of the transmitter and receiver optical subassemblies comprises a passive alignment process.

8. The method as recited in claim 1, wherein the alignment of the transmitter and receiver optical subassemblies comprises an active alignment process.

9. The method as recited in claim 1, wherein a plurality of transmitter and receiver optical subassemblies are aligned substantially simultaneously so as to form respective portions of a plurality of optical transceivers.

10. The method as recited in claim 1, wherein the transmitter and receiver optical subassemblies are substantially stationary during the alignment process.

11. The method as recited in claim 1, wherein alignment of the transmitter and receiver optical subassemblies is at least partially accomplished through motion of the transmitter and receiver optical subassemblies.

12. The method as recited in claim 1, further comprising at least indirectly fixing the transmitter and receiver optical subassemblies to the structure that defines the ports.

13. The method as recited in claim 1, further comprising performing the following after the alignment has been completed:
 permanently attaching the transmitter optical subassembly at least indirectly to one of the ports; and
 permanently attaching the receiver optical subassembly at least indirectly to the other port.

14. The method as recited in claim 1, wherein the ports each include a hollow sleeve defined by a sleeve assembly, the method further comprising permanently attaching the single substrate to the sleeve assembly.

15. The method as recited in claim 14, wherein the sleeve assembly includes a structure connecting each port, wherein the ports are connected together by the sleeve assembly prior to alignment of the receiver optical subassembly and the transmitter optical subassembly with the ports being performed in a single operation.

16. The method as recited in claim 1, wherein the transmitter optical subassembly and the receiver optical subassembly are positioned in a desired position relative to each other prior to simultaneous:
 alignment of the transmitter optical subassembly with one of the ports; and
 alignment of the receiver optical subassembly with the other port.

17. The method as recited in claim 1, wherein the substrate is connected to a strip of substrates when the transmitter optical subassembly and the receiver optical subassembly are positioned in a desired position relative to each other.

18. The method as recited in claim 1, wherein the substrate is connected to a strip of substrates during alignment of the receiver optical subassembly and the transmitter optical subassembly with the ports.

19. The method as recited in claim 1, wherein the position of the transmitter optical subassembly and the receiver optical subassembly varies by no more than five microns in any one direction from a desired specified spacing.

20. The method as recited in claim 1, wherein the position of the ports with respect to each other is fixed by a sleeve assembly 21. The method as recited in claim 20, wherein an end of each of the ports is fixed to a surface of the sleeve assembly thereby fixing the position of the ports with respect to each other.

22. The method as recited in claim 21, wherein the engaged slots and tracks prevents significant movement of the sleeve assembly with respect to the shell during connection of cables to the ports.

23. The method as recited in claim 20, wherein the sleeve assembly includes two slots on opposing sides of the sleeve assembly, the method further comprising engaging the two slots with tracks of a shell of the transceiver.

* * * * *

UNITED STATES PATENT AND TRADEMARK OFFICE
CERTIFICATE OF CORRECTION

| | | |
|---|---|---|
| PATENT NO. | : 7,435,014 B2 | Page 1 of 1 |
| APPLICATION NO. | : 10/924135 | |
| DATED | : October 14, 2008 | |
| INVENTOR(S) | : Paul K. Rosenberg | |

It is certified that error appears in the above-identified patent and that said Letters Patent is hereby corrected as shown below:

Col. 3
Line 47 change "an g" to --an--

Col. 8
Line 63 change "with the g" to --with the--

Signed and Sealed this

Ninth Day of March, 2010

David J. Kappos
*Director of the United States Patent and Trademark Office*